E. LANGEN.
Sugar Liquoring Apparatus.

No. 151,603. Patented June 2, 1874.

Witnesses
John Becker
Fred Haynes

Eugen Langen
by his attorneys
Brown & Allen

UNITED STATES PATENT OFFICE.

EUGEN LANGEN, OF COLOGNE, PRUSSIA.

IMPROVEMENT IN SUGAR-LIQUORING APPARATUS.

Specification forming part of Letters Patent No. 151,603, dated June 2, 1874; application filed May 15, 1874.

CASE B.

*To all whom it may concern:*

Be it known that I, EUGEN LANGEN, of Cologne, in the Kingdom of Prussia, have invented an Improved Sugar-Liquoring Apparatus, or table for use in the manufacture of hard sugar, of which the following is a specification:

This invention generally relates to apparatus for impregnating the sugar mass, after it has been purged of green sirup, with white or claying liquor, and which is usually composed of a saturated solution of sugar, and more particularly relates to a process of manufacturing hard sugar, for which another application for patent is made by me simultaneously with this, and in which the sugar mass, while in the molds into which it has been run from the vacuum-pan and allowed to crystallize and cool, is first subjected to a purging action in a centrifugal machine, for the purpose of expelling the green sirup, then removing said molds with their contents, and separately treating the mass in the molds to the claying-liquor by forcing the latter in an upward direction through the mass by hydrostatic, hydraulic, or other pressure, and independent of a vacuum applied to the molds, and subsequently, and by a separate operation, expelling, by centrifugal machine, the claying-liquor from the mass in the molds.

This invention consists in a novel construction of liquoring-table, and means for forcing the claying-liquor up through the sugar mass in the molds, to indicate the thorough permeation of the mass by the cleansing-liquor, and whereby the cleansing operation is accomplished in a very simple and perfect manner, and a free escape established for the air in the sugar mass within the molds.

Figure 1:
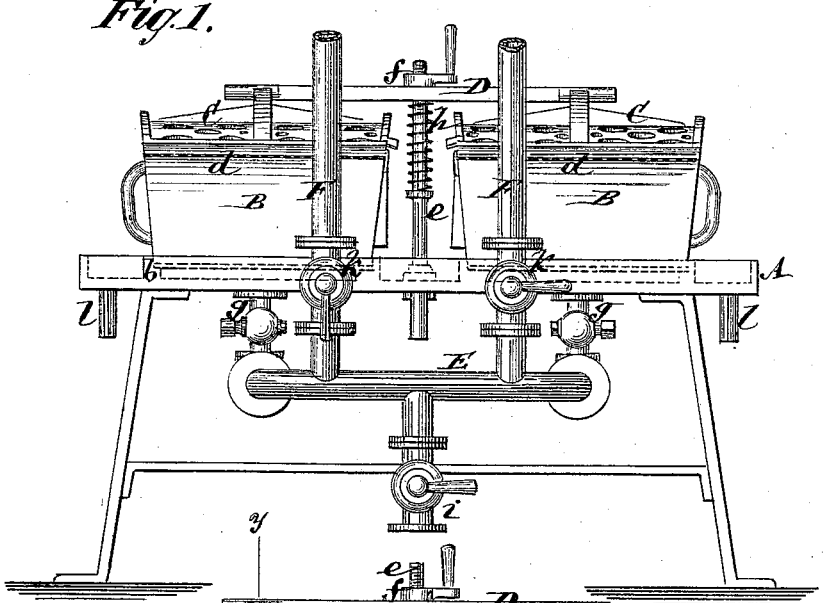
Figure 2:
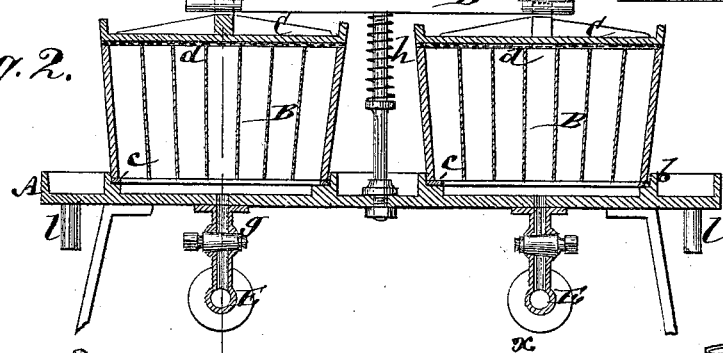
Figure 3:
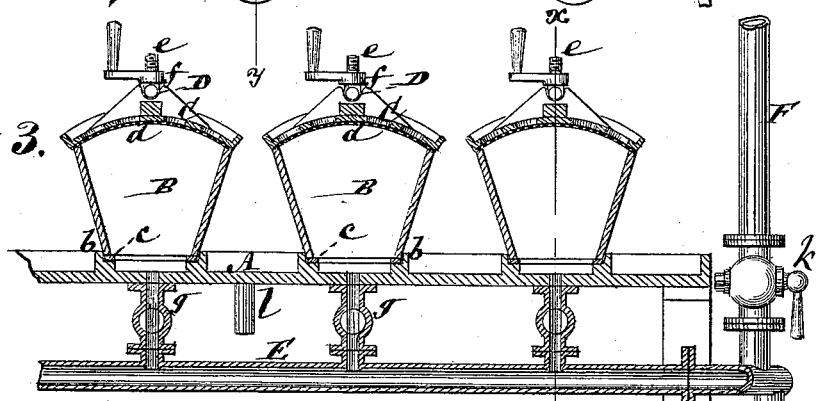

In the accompanying drawing, Figure 1 represents an end elevation of an apparatus constructed in accordance with my invention; Fig. 2, a transverse vertical section of the same on the line *x x* in Fig. 3, which is a longitudinal sectional elevation on the line *y y*.

Similar letters of reference indicate corresponding parts.

The cleansing apparatus represented in the accompanying drawing consists, mainly, of a table, A, provided with a number of seats or recesses, *b*, for reception of the molds B containing the sugar mass to be cleansed, said seats and molds being arranged in longitudinal rows, side by side. After the molds containing the sugar mass from which the green sirup has been removed are taken out of the centrifugal machine they are put, with their smaller open faces downward, into the seats or recesses *b* in the table. An india-rubber or other suitable gasket, *c*, is interposed between the bottoms of the molds and the tops or faces of the seats *b*, in order that each mold may make a close fit with the table on which it rests. When the molds have been thus seated on the table in longitudinal rows, arranged side by side, the upper and larger open faces of the molds are closed by temporary perforated covers C, lined with a wire-gauze or other perforated packing, *d*, such perforations in the covers of the molds serving to provide for the escape of air and sirup from the sugar mass during the cleansing process. The upper side of each cover should be furnished with a knob or handle. The seats *b* are somewhat raised above the general surface of the table, so as to form ways for the escape of the cleansing-liquor, together with remaining green sirup, after the former has permeated the masses in the molds. Between the longitudinal rows of mold-seats *b* are fixed uprights *e*, having a screw-thread on their upper ends. Nuts *f* are fitted on the screw-ends of these uprights *e* for the purpose of bearing down on bars D, or their equivalents, to close the covers C on the molds, said bars fitting loosely over the uprights *e*, and bearing down on the knobs of the covers of adjacent molds, thereby holding the several molds firmly together and tightly upon their seats. Springs *h*, arranged around the upright rods *e*, serve to lift the bars D, when, by unscrewing the nuts *f* it is required to take off the temporary covers C and remove the molds from the table. Arranged under the table are pipes E, communicating by branches *g*, which may have regulating-cocks, with the interior or hollow portions of the seats *b* that are made to form basins, said pipes E and branches g serving to convey the cleansing-liquor to the sugar mass in the molds, and the pipes E being furnished with a draw-off cock, i. The pipes E are supplied with the cleansing-liquor under pressure—as, for instance, by pump or by hydrostatic pressure, down one or more pipes, F, furnished with cocks k. Upon opening the cocks k the cleansing-liquor is forced through the pipes E and branches g into and through the sugar mass in the molds, the same rising through the sugar and displacing the air therein, and forcing any remaining green sirup upward through the top openings of the molds and their perforated covers. In this way the sugar mass is completely saturated with the cleansing-agent as soon as the latter begins to freely flow through the perforations in the temporary covers of the molds, and upon which being observed the further supply of the cleansing-liquor is shut off, thus avoiding all waste of the cleansing-liquor. The liquor which overflows out of the molds through the perforations in their covers runs upon the table and out of one or more outlets, l, into any suitable vessel placed underneath the table for the purpose.

After the liquored molds have thus been treated they are returned to the centrifugal machine for the purpose of expelling the cleansing-liquor, and any remaining green sirup, from the sugar masses in the molds.

It is evident that the shape of the table A may be variously changed—as, for instance, it may be round, with the seats b in concentric relation thereto, so that a single central upright screw-rod, e, and nut f, and single closing bar or frame operated by the nut to press the covers down on the molds, will suffice; or the table may be made to stand around the centrifugal machine; or a separate table may be used for each mold. In all such modifications, however, the liquoring process will be the same—that is, the opposite open-faced molds made tapering for arrangement within the centrifugal machine, with their smallest faces inward and occupying the lowermost position when on the liquoring-table, so that the cleansing-agent, in entering through the smallest face of the molds, and passing upward through the sugar mass, will easily displace the air in the sugar mass, and also force the remaining green sirup upward and out of the largest open faces of the molds, which faces will, in the subsequent operation of purging, be nearest to the basket of the centrifugal machine, and any sirup remaining in the sugar mass at such part will consequently be drained out so soon as the centrifugal machine is set in motion, and not be forced through the entire mass.

The operations of liquoring upon the table and afterward removing the cleansing-liquor by centrifugal action may be repeated, if necessary, until perfectly-white sugar is obtained.

I claim—

A liquoring-table, constructed to receive the inner or bottom open faces of the molds, in combination with pipes or conduits arranged to admit the cleansing agent or liquor under pressure to the under side of the sugar mass in the molds, and so that said liquor is forced upward through said mass, and through the outer or top faces of the molds or their perforated covers, substantially as and for the purposes herein set forth.

EUGEN LANGEN.

Witnesses:
ALB. LANGEN,
C. KURTZ.